US009658708B2

(12) United States Patent
Misaki

(10) Patent No.: US 9,658,708 B2
(45) Date of Patent: May 23, 2017

(54) TOUCH PANEL AND TOUCH PANEL-EQUIPPED DISPLAY DEVICE

(71) Applicant: Sharp Kabushiki Kaisha, Osaka-shi, Osaka (JP)

(72) Inventor: Katsunori Misaki, Yonago (JP)

(73) Assignee: Sharp Kabushiki Kaisha, Sakai (JP)

( * ) Notice: Subject to any disclaimer, the term of this patent is extended or adjusted under 35 U.S.C. 154(b) by 135 days.

(21) Appl. No.: 14/408,377

(22) PCT Filed: Jun. 28, 2013

(86) PCT No.: PCT/JP2013/067792
§ 371 (c)(1),
(2) Date: Dec. 16, 2014

(87) PCT Pub. No.: WO2014/007155
PCT Pub. Date: Jan. 9, 2014

(65) Prior Publication Data
US 2015/0153881 A1 Jun. 4, 2015

(30) Foreign Application Priority Data
Jul. 2, 2012 (JP) ................... 2012-148179

(51) Int. Cl.
*G06F 3/045* (2006.01)
*G06F 3/041* (2006.01)
*G06F 3/044* (2006.01)
*G02F 1/1333* (2006.01)

(52) U.S. Cl.
CPC ........ *G06F 3/0412* (2013.01); *G02F 1/13338* (2013.01); *G06F 3/044* (2013.01); *G06F 2203/04103* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| 2008/0309635 | A1* | 12/2008 | Matsuo | G06F 3/044 345/173 |
| 2010/0233930 | A1* | 9/2010 | Ishida | G06F 3/0412 445/24 |
| 2011/0031497 | A1* | 2/2011 | Yamazaki | H01L 27/1225 257/59 |

(Continued)

FOREIGN PATENT DOCUMENTS

JP 2011-090443 A 5/2011

*Primary Examiner* — Jennifer Mehmood
*Assistant Examiner* — Stephen T Reed
(74) *Attorney, Agent, or Firm* — Keating & Bennett, LLP

(57) ABSTRACT

An arrangement of a cover-integrated touch panel is provided that ensures that sensor electrodes are properly connected with wiring lines. The touch panel includes: a transparent substrate; a light-shielding film on a portion of the substrate; a planarizing film over the substrate and the light-shielding film; a barrier film over the planarizing film; a sensor electrode on the barrier film; a terminal in a region that overlaps the light-shielding film; and a wiring line to electrically connect the sensor electrode with the terminal. The barrier film includes a first inorganic film adjacent to the planarizing film and a second inorganic film on the first inorganic film with a smaller refractive index than the first inorganic film.

8 Claims, 15 Drawing Sheets

(56) References Cited

U.S. PATENT DOCUMENTS

| | | | |
|---|---|---|---|
| 2011/0141042 A1* | 6/2011 | Kim | G02F 1/13338 345/173 |
| 2012/0104530 A1* | 5/2012 | Kaneko | G02F 1/1362 257/433 |
| 2012/0127094 A1* | 5/2012 | Jeong | G06F 3/044 345/173 |
| 2013/0063820 A1* | 3/2013 | Yang | G06F 3/044 359/585 |

* cited by examiner

TOUCH PANEL AND TOUCH PANEL-EQUIPPED DISPLAY DEVICE

TECHNICAL FIELD

The present invention relates to a touch panel and a touch panel-equipped display device, and more particularly to a cover glass-integrated touch panel and touch panel-equipped display device.

BACKGROUND ART

A touch panel is attached to a cover glass or cover film before being used. When a touch panel is attached to a cover glass, air bubbles may be produced or foreign substances may be introduced, which may reduce yield.

A known cover glass-integrated touch panel includes sensor electrodes provided on the back side of the cover glass (i.e. the side of the glass opposite the operation side). In this arrangement, the substrate of the touch panel also serves as a cover glass (or cover film).

JP 2011-90443 A describes a projected capacitive touch panel including one transparent substrate, where electrodes extending in a first direction and electrodes extending in a second direction that crosses the first direction are provided on one side of the transparent substrate, and a black mask (i.e. light-shielding film) made of a light-shielding material is provided on the peripheral portions of the transparent substrate.

The black mask may be provided, for example, so as to hide from the viewer the routed lines for electrodes and connecting parts for signal processing provided on the peripheral portions of the transparent substrate. The use of a pigment-type color filter material for the black mask is disclosed.

DISCLOSURE OF THE INVENTION

As discussed above, it is known to provide a light-shielding film on the non-sensing area of the touch panel and provide lines and the like so as to overlie the light-shielding film to prevent them from being visible to the user. However, when conductive films that implement sensor electrodes, lines and the like are formed to straddle the border between a region having a light-shielding film and a region without such a film, the steps in the light-shielding film may break off the conductive films.

An object of the present invention is to provide a highly-reliable arrangement of a cover-integrated touch panel that ensures that the sensor electrodes are properly connected with the lines.

A touch panel disclosed herein includes: a transparent substrate; a light-shielding film provided on a portion of the substrate; a planarizing film provided over the substrate and the light-shielding film; a barrier film provided on the planarizing film; a sensor electrode provided on the barrier film; a terminal provided in a layer that is more distant from the substrate than the planarizing film is in a region that overlies the light-shielding film in a plan view; and a line provided in a layer that is more distant from the substrate than the planarizing film is to electrically connect the sensor electrode with the terminal. The barrier film includes: a first inorganic film located adjacent the planarizing film and formed of an inorganic material; and a second inorganic film located on the first inorganic film and formed of an inorganic material with a smaller refractive index than the first inorganic film.

The present invention provides a highly-reliable line arrangement of a cover-integrated touch panel that ensures that the sensor electrodes are properly connected with the lines.

EMBODIMENTS FOR CARRYING OUT THE INVENTION

Figure 1:
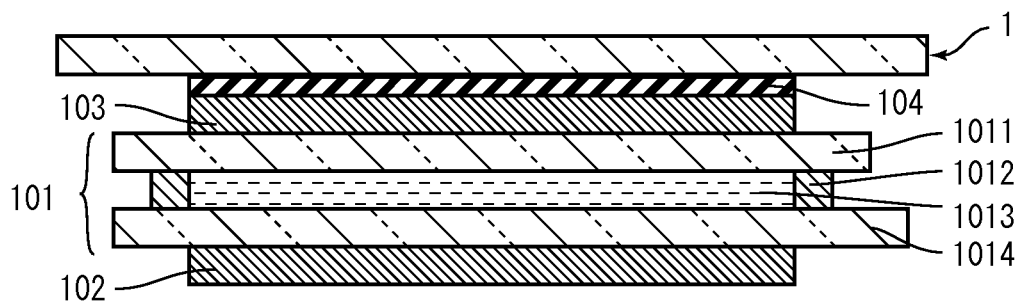
FIG. 1 is a schematic cross-sectional view of a touch panel-equipped display device according to an embodiment of the present invention.

A touch panel according to an embodiment of the present invention includes: a transparent substrate; a light-shielding film provided on a portion of the substrate; a planarizing film provided over the substrate and the light-shielding film; a barrier film provided over the planarizing film; a sensor electrode provided on the barrier film; a terminal provided in a layer that is more distant from the substrate than the planarizing film is in a region that overlies the light-shielding film in a plan view; and a line provided in a layer that is more distant from the substrate than the planarizing film is to electrically connect the sensor electrode with the terminal. The barrier film includes: a first inorganic film located adjacent the planarizing film and formed of an inorganic material; and a second inorganic film located on the first inorganic film and formed of an inorganic material with a smaller refractive index than the first inorganic film (first arrangement).

In the above arrangement, a planarizing film is provided over the substrate and light-shielding film. The planarizing film planarizes the steps produced by the light-shielding film. As such, the steps in the light-shielding film do not affect elements in layers that are more distant from the substrate than the planarizing film is. Thus, when sensor electrodes or lines are formed to straddle an edge of the light-shielding film in a plan view, the sensor electrodes or lines are not broken by the steps in the light-shielding film.

Further, in the above arrangement, a barrier film is provided over the planarizing film and the sensor electrodes are located on the barrier film. The barrier film includes films of an inorganic material to block water and impurities from the planarizing film. This will prevent the sensor electrodes from being affected by water or impurities from the planarizing film, which would increase the resistance of the sensor electrodes.

Further, in the above arrangement, the barrier film includes a first inorganic film provided adjacent the planarizing film and a second inorganic film with a smaller refractive index than the first inorganic film. Generally, the higher the refractive index of a film of inorganic material, the denser the film becomes; the lower the refractive index of a film, the coarser the film. Accordingly, the first inorganic film is denser than the second inorganic film and has a higher barrier performance. On the other hand, the second inorganic film is coarser than the first inorganic film and has a higher reactivity. As the barrier film is a laminate including first and second inorganic films, a high barrier performance is achieved and its adhesion to sensor electrodes is improved.

Starting from the first arrangement, the first inorganic film may have a refractive index of 1.72 to 1.98, and the second inorganic film may have a refractive index of 1.41 to 1.68 (second arrangement).

Starting from the second arrangement, the first inorganic film may preferably have a thickness of 3 to 12 nm, and the second inorganic film may preferably have a thickness of 30 to 160 nm (third arrangement).

The above arrangements will improve the optical transmittance of the sensor electrodes using the interference of light reflected from the interfaces between the films. This will make it less likely that the sensor electrodes will be visible to the user.

Starting from any one of the first to third arrangements, the first inorganic film may include a silicon nitride film (fourth arrangement).

Starting from any one of the first to fourth arrangements, the second inorganic film may include one of silicon oxide and silicon oxynitride (fifth arrangement).

Starting from any one of the first to fifth arrangements, the line may preferably be located in a region that overlies the light-shielding film in a plan view (sixth arrangement).

In the above arrangements, the lines are prevented from being visible to the user by the light-shielding film. This eliminates the necessity for using a material with a high optical transmittance to form the lines. As such, a metal film with a low electric resistance may be used for the lines, for example.

Starting from any one of the first to sixth arrangements, the terminal may preferably be located on the barrier film (seventh arrangement).

The above arrangement prevents the terminals from being affected by water from the planarizing film, which would increase the resistance of the terminals. This in turn eliminates the need for forming the terminals from a moisture-resistant material or increasing the thickness of the terminals. This makes it possible, for example, to form the sensor electrodes and terminals from the same material in the same step to reduce the number of manufacturing steps.

A touch panel-equipped display device according to an embodiment of the present invention includes: a liquid crystal display device; and the touch panel of any one of the first to seventh arrangements (first arrangement of a touch panel-equipped display device).

Embodiments

Now, embodiments of the present invention will be described in more detail with reference to the drawings. The same or corresponding elements in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

[Overall Construction]

FIG. 1 is a schematic cross-sectional view of a touch panel-equipped display device 100 according to an embodiment of the present invention. The touch panel-equipped display device 100 includes a touch panel 1, a liquid crystal display device 101, polarizers 102 and 103 and a pasting material 104.

The polarizers 102 and 103 are disposed on the opposite sides of the liquid crystal display device 101. The touch panel 1 is attached to the polarizer 103 by means of the pasting material 104.

As described in detail below, the touch panel 1 has sensor electrodes on its side adjacent the liquid crystal display device 101. The sensor electrodes are capable of creating a capacitance between themselves and a finger or the like that is positioned close to the touch panel 1. Based on changes in the capacitance, the touch panel 1 is capable of detecting the location of the finger or the like.

A light-shielding film is provided on a predetermined area of the touch panel 1. The light-shielding film hides portions of the panel that one does not wish to be seen by the user.

Examples of portions that one does not wish to be seen by the user include lines and terminals of the touch panel 1, or the terminals and the like of the liquid crystal display device 101.

The liquid crystal display device 101 includes a color filter substrate 1011, a thin film transistor (TFT) substrate 1014, a seal material 1012 and liquid crystal 1013. A side of the color filter substrate 1011 faces a side of the TFT substrate 1014. The seal material 1012 is provided on the peripheral portions of the color filter substrate 1011 and TFT substrate 1014, and the liquid crystal 1013 is enclosed within.

The TFT substrate 1014 has a greater area than the color filter substrate 1011. Terminals, not shown, are provided on the areas of the TFT substrate 1014 that do not overlie the color filter substrate 1011 when the substrates are attached to each other. These terminals are connected to a drive circuit, not shown, via a flexible printed circuit (FPC), for example.

The TFT substrate 1014 is provided with pixel electrodes and TFTs, not shown. The pixel electrodes and TFTs are arranged in a matrix. The TFTs may be ones that contain amorphous silicon or indium zinc gallium oxide (IZGO); preferably, the TFTs may be ones that contain IZGO, which permits greater electron movement.

The color filter substrate 1011 is provided with color filters and a common electrode, not shown. The color filters are arranged regularly so as to correspond to the pixel electrodes on the TFT substrate 1014. The common electrode is uniformly shaped and present on the active area of the TFT substrate 1014.

The liquid crystal display device 101 may drive the TFTs on the TFT substrate 1014 to create an electric field between an intended pixel electrode and the common electrode in order to control the orientation of the liquid crystal 1013. The liquid crystal display device 101 uses the orientation of the liquid crystal 1013 and the polarizers 102 and 103 to control each pixel to be light transmitting or non-transmitting. This causes an image to be displayed on the liquid crystal display device 101.

The touch panel-equipped display device 100 has been schematically described. In the touch panel-equipped display device 100, the substrate of the touch panel 1 serves as a cover glass or cover film. Thus, it is not necessary to attach an additional cover glass or cover film to the touch panel 1. This simplifies the manufacturing process. It further prevents decrease in yield caused by air bubbles produced or foreign substances introduced when the touch panel 1 were attached to the cover glass or cover film. Further, eliminating elements such as a cover glass reduces the thickness of the liquid crystal display device 101, thereby improving optical transmittance.

Figure 2:
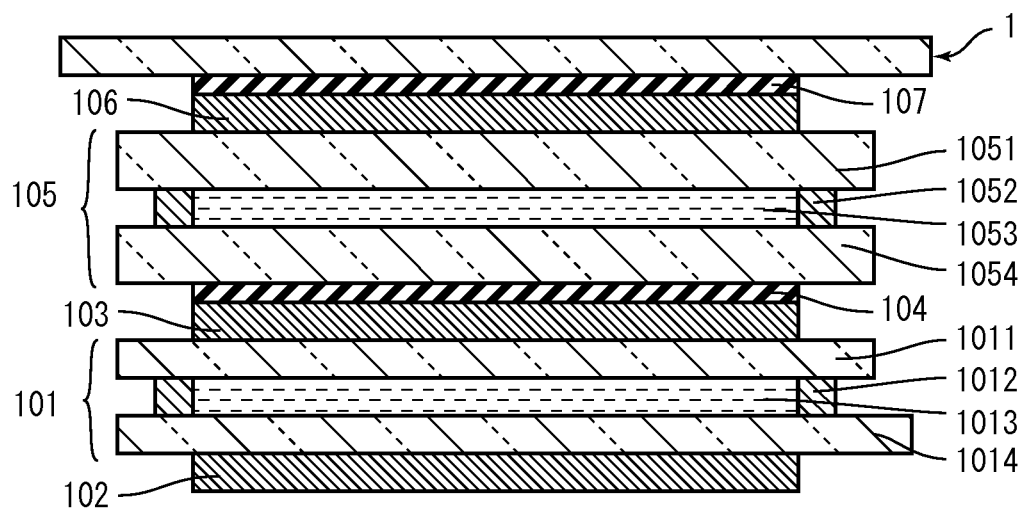
FIG. 2 is a schematic cross-sectional view of a touch panel-equipped display device according to another embodiment of the present invention.

FIG. 2 is a schematic cross-sectional view of a touch panel-equipped display device 200 according to another embodiment of the present invention. The touch panel-equipped display device 200 includes, in addition to the components of the touch panel-equipped display device 100, a switch liquid crystal panel 105, a polarizer 106 and a pasting material 107.

The switch liquid crystal panel 105 is attached to the polarizer 103 by means of the pasting material 104. The polarizer 106 is disposed on the side of the switch liquid crystal panel 105 that is opposite the side adjacent the liquid crystal display device 101. The touch panel 1 is attached to the polarizer 106 by means of the pasting material 107.

The switch liquid crystal panel 105 includes a control substrate 1051, a counter-substrate 1054, a seal material 1052 and liquid crystal 1053. A side of the control substrate 1051 faces a side of the counter-substrate 1054. The seal material 1052 is provided on the peripheral portions of the control substrate 1051 and counter-substrate 1054, and the liquid crystal 1053 is enclosed within.

The control substrate 1051 is provided with control electrodes, not shown. The control electrodes are arranged regularly on the control substrate 1051. The counter-substrate 1054 includes a common electrode, not shown. The common electrode is uniformly shaped and present on the active area of the counter-substrate 1054. The switch liquid crystal panel 105 generates an electric field between an intended control electrode and the common electrode to change the orientation of the liquid crystal 1053.

The touch panel-equipped display device 200 switches between 2D display mode and 3D display mode in the following manner:

In 2D display mode, the liquid crystal 1053 of the switch liquid crystal panel 105 is oriented uniformly. As such, an image displayed on the liquid crystal display device 101 is displayed without a change.

In 3D display mode, the switch liquid crystal panel 105 changes the orientation of the liquid crystal 1053 on a regular basis. The changes in orientation causes differences in refractive index, which enable the liquid crystal 1053 to function as a lens. In a manner consistent with this, the touch panel-equipped display device 200 causes the liquid crystal display device 101 to display images that have been captured from multiple directions and include sub-images arranged regularly. The displayed sub-images arranged regularly are separated by the liquid crystal 1053. When the viewer sees the touch panel-equipped display device 200 from an optimum location, different images reach each eye. That is, in 3D display mode, the touch panel-equipped display device 200 achieves 3D displaying using a so-called parallax technique.

The touch panel-equipped display device 200 has been schematically described. In the touch panel-equipped display device 200, too, the substrate of the touch panel 1 serves as a cover glass or cover film.

[Construction of Touch Panel]

First Embodiment

Figure 3:
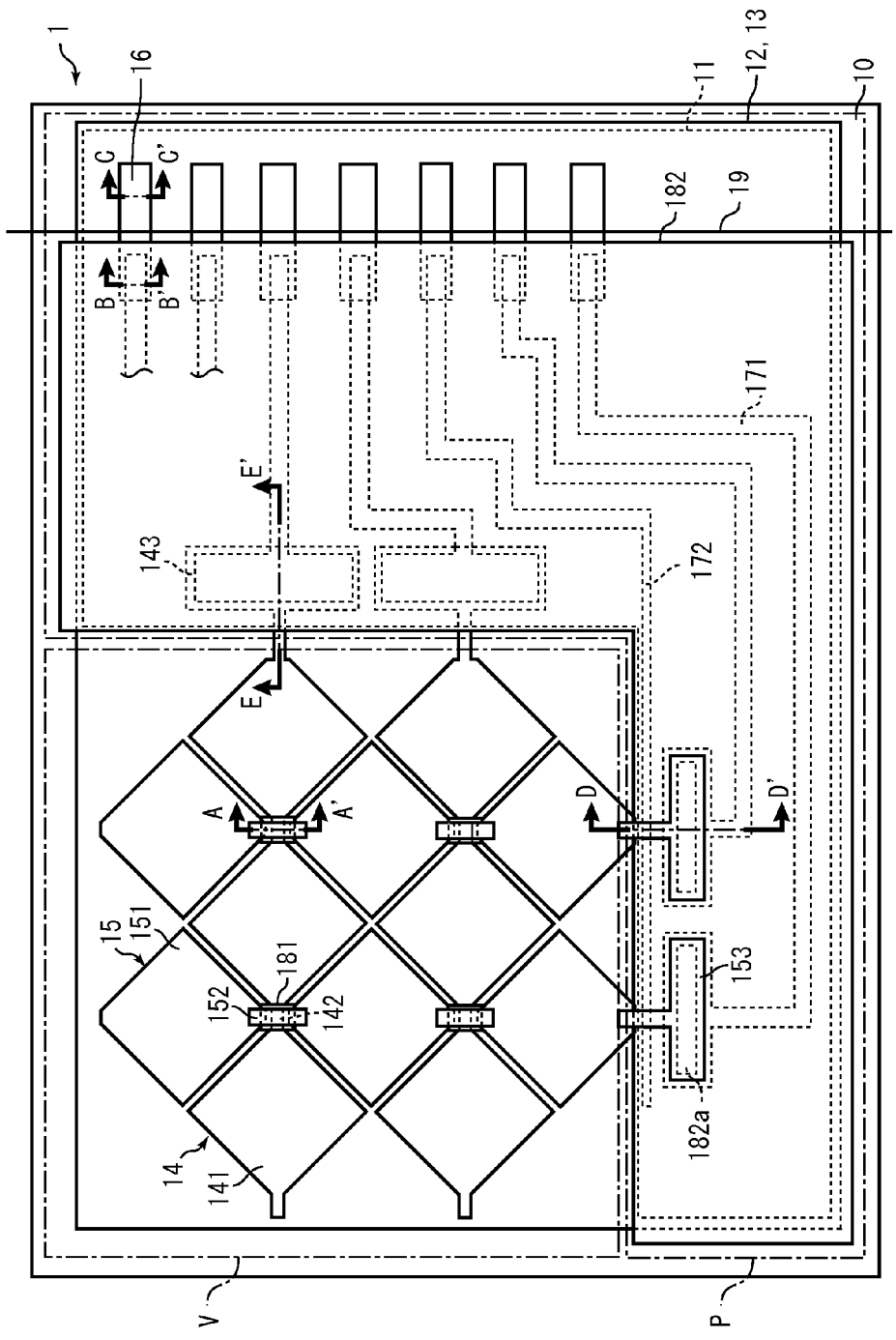
FIG. 3 is a schematic plan view of a touch panel according to a first embodiment of the present invention.
Figure 4:
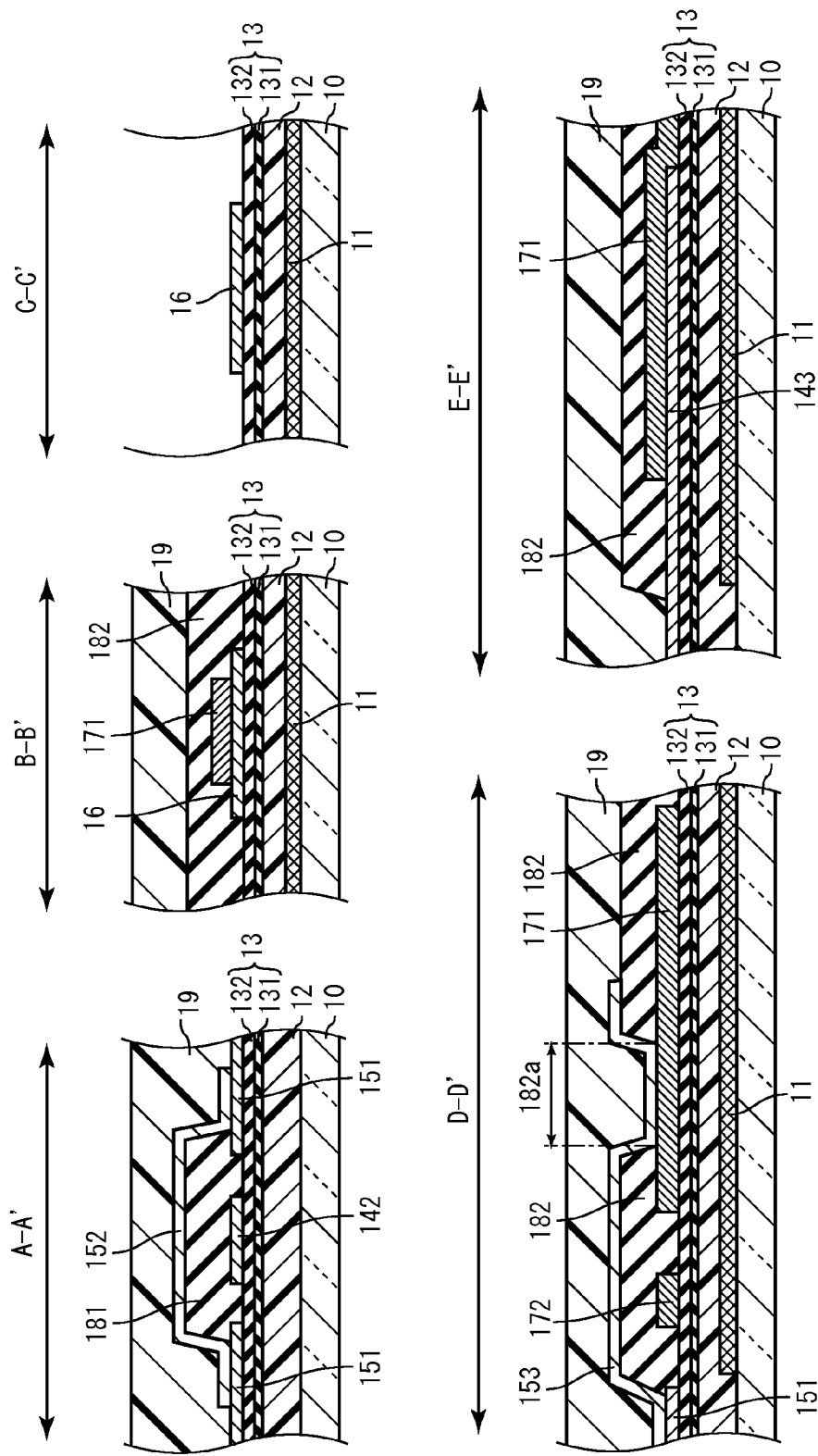
FIG. 4 shows cross-sections taken along lines A-A', B-B', C-C', D-D' and E-E' of FIG. 3.

The construction of the touch panel 1 will be described in detail below. FIG. 3 is a schematic plan view of a touch panel 1 according to a first embodiment of the present invention. FIG. 4 shows cross-sections taken along lines A-A', B-B', C-C', D-D' and E-E' of FIG. 3. The touch panel 1 includes a substrate 10, a light-shielding film 11, a planarizing film 12, a barrier film 13, X electrodes 14, Y electrodes 15, terminals 16, lines 171, a ground line 172, insulating films 181 and 182, and a protection film 19.

The substrate 10 is transparent. The substrate 10 may be, for example, a glass substrate or a transparent resin film. A surface of the substrate 10 may be coated with a passivation film or the like. The light-shielding film 11, planarizing film 12, barrier film 13, X electrodes 14, Y electrodes 15, terminals 16, lines 171, ground line 172, insulating films 181 and 182 and protection film 19 are located on one of the sides of the substrate 10. The touch panel-equipped display device 100 is constructed such that this side is located adjacent the liquid crystal display device 101.

The touch panel 1 includes a sensing area V and a non-sensing area P. The sensing area V is an area of the touch panel 1 that allows a touch by a finger or the like to be detected. That is, the sensing area V is the region having sensor electrodes (X and Y electrodes 14 and 15) provided therein. The sensing area V is not limited to a rectangular region shown in FIG. 3, but may be in any shape. It may even be made up of discontinuous regions. Preferably, the sensing area V is placed over the display region of the liquid crystal display device 101. Such an arrangement allows the user to input a location relative to an image displayed on the liquid crystal display device 101.

In FIG. 3, the non-sensing area P is disposed to the right of the sensing area V and below it. However, the non-sensing area P may be disposed in any manner. For example, the non-sensing area P may surround the four sides of the sensing area V. Alternatively, the non-sensing area P may be in contact with one side only of the sensing area V.

The light-shielding film 11 is provided generally over the entire surface of the non-sensing area P. Alternatively, the light-shielding film 11 may be provided only over portions of the non-sensing area P. The light-shielding film 11 is capable of blocking light. The light-shielding film 11 may be made of a black resin, for example. The light-shielding film 11 prevents the user from seeing the elements in layers that are more distant from the substrate 10 than the light-shielding film 11 is.

The planarizing film 12 is provided over the substrate 10 and light-shielding film 11. The planarizing film 12 eliminates the steps in the substrate 10 and light-shielding film 11. The planarizing film 12 may be formed of a transparent resin, for example.

The barrier film 13 is provided over the planarizing film 12. In the present embodiment, the barrier film 13 is provided generally over the entire surface of the planarizing film 12. Preferably, the barrier film 13 generally covers the entire surface of the planarizing film 12, as in the present embodiment. Alternatively, the barrier film 13 may be provided only over portions of the planarizing film 12.

The barrier film 13 includes a first inorganic film 131 located adjacent the planarizing film 12 and a second inorganic film 132 located on the first inorganic film 131. The second inorganic film 132 is formed of a material with a smaller refractive index than the first inorganic film 131.

In the present embodiment, the X electrodes 14, Y electrodes 15, terminals 16, lines 171, ground line 172, insulating films 181 and 182 and protection film 19 are located on the barrier film 13.

Figure 5:
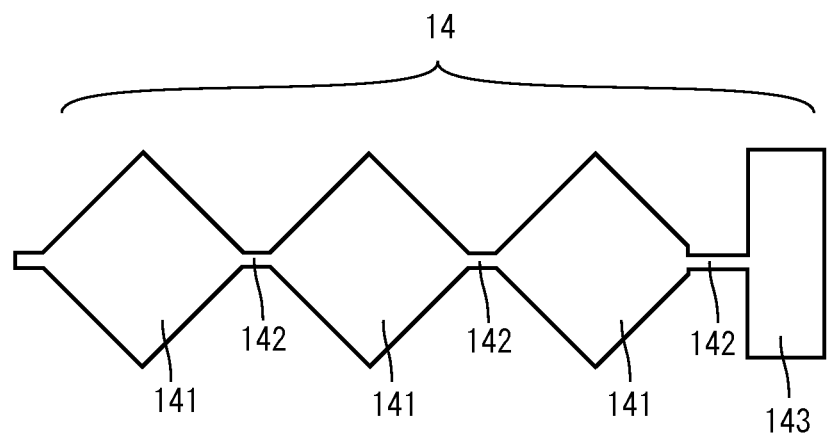
FIG. 5 is a plan view of one of the X electrodes.

FIG. 5 is a plan view of one of the X electrodes 14. The X electrode 14 includes a plurality of insular electrodes 141 arranged along one direction and connecting portions 142, each connecting portion connecting two adjacent insular electrodes 141. The X electrode 14 further includes a connecting portion 143 located at one end of its extension for providing connection to a line 171. The insular electrodes 141 and connecting portions 142 and 143 are integrally formed.

Figure 6:
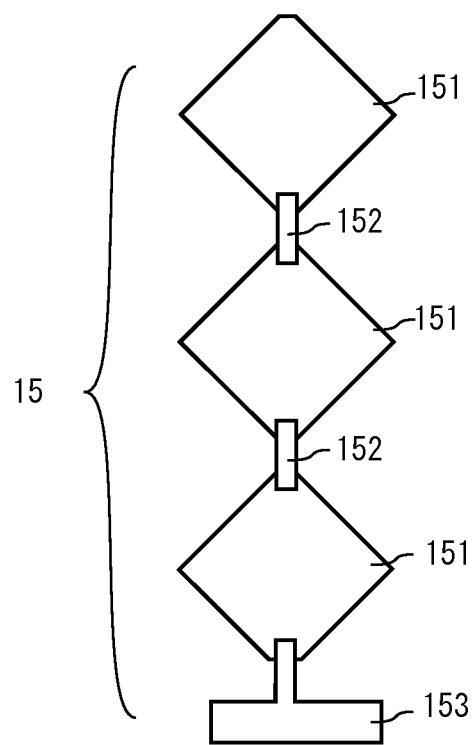
FIG. 6 is a plan view of one of the Y electrodes.

FIG. 6 is a plan view of one of the Y electrodes 15. The Y electrode 15 includes a plurality of insular electrodes 151 arranged along a direction that crosses the X electrodes 14, and connecting portions 152, each connecting portion connecting two adjacent insular electrodes 151. The Y electrode 15 further includes a connecting portion 153 located at one end of its extension for providing connection to a line 171. As described below, the insular electrodes 151 and the connecting portions 152 and 153 are formed in different steps.

The X and Y electrodes 14 and 15 are formed of a material that is transparent and electrically conductive. The X and Y electrodes 14 and 15 may be made of indium tin oxide (ITO) or indium zinc oxide (IZO), for example.

Returning to FIGS. 3 and 4, an insulating film 181 is provided at the intersection of an X electrode 14 and a Y electrode 15. Each of the connecting portions 152 of a Y electrode 15 extends over an insulating film 181 to connect two adjacent insular electrodes 151. This arrangement insulates an X electrode 14 from a Y electrode 15.

Terminals 16 are provided in the non-sensing area P. The terminals 16 may be connected to a drive circuit, not shown, via an FPC, for example. To facilitate this, the terminals 16 are not covered by the insulating film 182 nor the protection film 19. Thus, the terminals 16 are preferably formed of a material with a high corrosion resistance. The terminals 16 may be made of ITO or IZO, for example.

Each line 171 electrically connects an X electrode 14 to a terminal 16, or a Y electrode 15 to a terminal 16. More specifically, a line 171 connecting an X electrode 14 to a terminal 16 is in contact with the terminal 16 and the connecting portion 143 of the X electrode 14. A line 171 connecting a Y electrode 15 to a terminal 16 is in contact with the terminal 16 and the connecting portion 153 of the Y electrode 15. The line 171 is connected with the connecting portion 153 via a contact hole 182a formed in the insulating film 182. The ground line 172 is connected with a terminal 16 only, and is not connected with an X electrode 14 or Y electrode 15. The ground line 172 serves as a shield line for blocking electromagnetic noise. The lines 171 and ground line 172 may be made of metal films, for example.

An insulating film 182 is provided over the lines 171 and ground line 172. The insulating film 182 protects the lines 171 and ground line 172 from agents used in the subsequent steps during manufacture of the touch panel 1. Further, the insulating film 182 protects the lines 171 and ground line 172 from water in the environment. The insulating film 182 also serves as an interlayer insulating film for preventing the connecting portions 153 of the Y electrodes 15 and the ground line 172 from being short-circuited.

The protection film 19 is provided generally over the entire surface of the substrate 10. As discussed above, portions of the substrate 10 and terminals 16 are not covered with the protection film 19, i.e. are exposed.

The insulating films 181 and 182 and the protection film 19 are formed of transparent insulating materials. The insulating films 181 and 182 and the protection film 19 may be made of organic materials or inorganic materials.

[Method of Manufacturing Touch Panel 1]

A method of manufacturing a touch panel 1 will be described below with reference to FIGS. 7A to 7H. FIGS. 7A to 7H show cross-sections taken along lines A-A', B-B', C-C', D-D' and E-E' of FIG. 3.

Figure 7A:
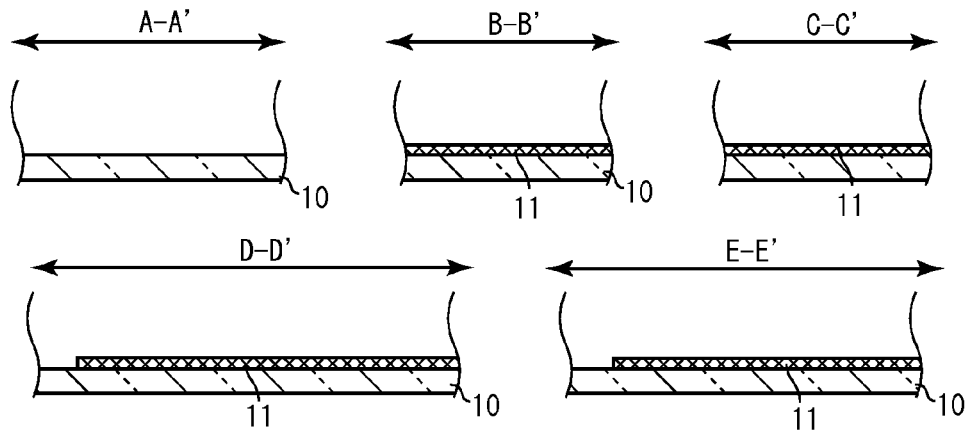
FIG. 7A shows cross-sections for illustrating a method of manufacturing the touch panel according to the first embodiment of the present invention.

As shown in FIG. 7A, on a substrate 10 is formed a light-shielding film 11. The light-shielding film 11 may be made of a low-resistance metal, such as chromium, or a black resin; preferably, a black resin is used. The black resin may be, for example, an acrylic resin or novolak resin with a black pigment dispersed therein. The light-shielding film 11 may be formed by, for example, a printing method such as screen printing or flexography, or photolithographic patterning.

Figure 7B:
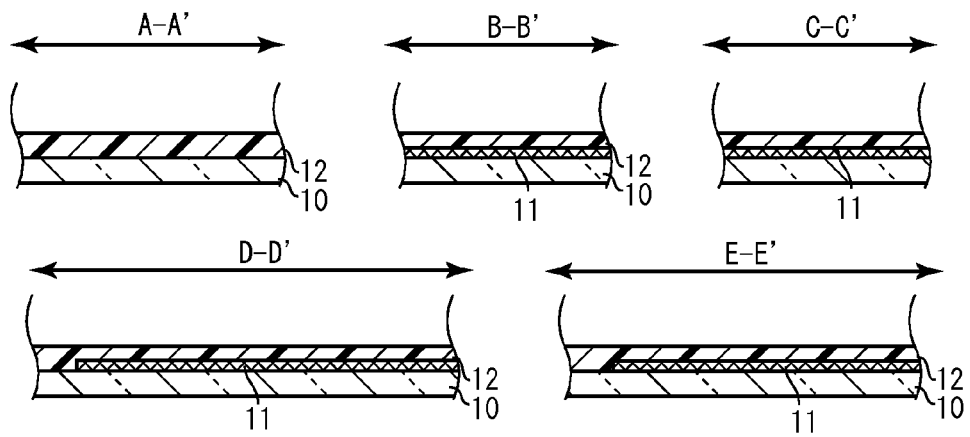
FIG. 7B shows cross-sections for illustrating the method of manufacturing the touch panel according to the first embodiment of the present invention.

Next, as shown in FIG. 7B, a planarizing film 12 is formed over the light-shielding film 11. The planarizing film 12 may be mostly composed of an acrylic resin, novolak resin, epoxy resin, alkyl resin, phenol resin or silicon resin, for example.

The planarizing film 12 is formed using a spin coater or slit coater, for example, on a predetermined region of the substrate 10. The planarizing film 12 may have any thickness larger than that of the light-shielding film 11, for example in the range of 1.5 to 3.5 µm.

Figure 7C:
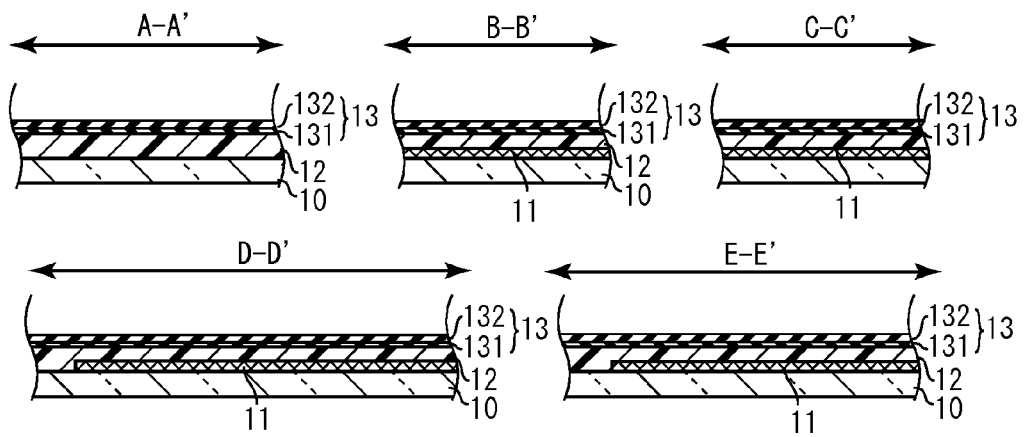
FIG. 7C shows cross-sections for illustrating the method of manufacturing the touch panel according to the first embodiment of the present invention.

Next, as shown in FIG. 7C, a barrier film 13 is formed over the planarizing film 12. As discussed above, the barrier film 13 is a laminate including a first inorganic film 131 and a second inorganic film 132. The second inorganic film 132 is made of a material with a lower refractive index than the first inorganic film 131. The refractive index of the first inorganic film 131 is preferably in the range of 1.72 to 1.98. The refractive index of the second inorganic film 132 is preferably in the range of 1.41 to 1.68. The first inorganic film may be made of silicon nitride (SiN), for example. The second inorganic film may be made of silicon oxide (SiO) or silicon oxynitride (SiON), for example.

The first inorganic film 131 and second inorganic film 132 are formed by chemical vapor deposition (CVD), for example. The refractive indices of the first inorganic film 131 and the second inorganic film 132 may be regulated by adjusting the gas flow rate, pressure and heating temperature during film formation, for example. Preferably, as discussed below, the thickness of the first inorganic film 131 is in the range of 3 to 12 nm and the thickness of the second inorganic film 132 is in the range of 30 to 160 nm.

Figure 7D:
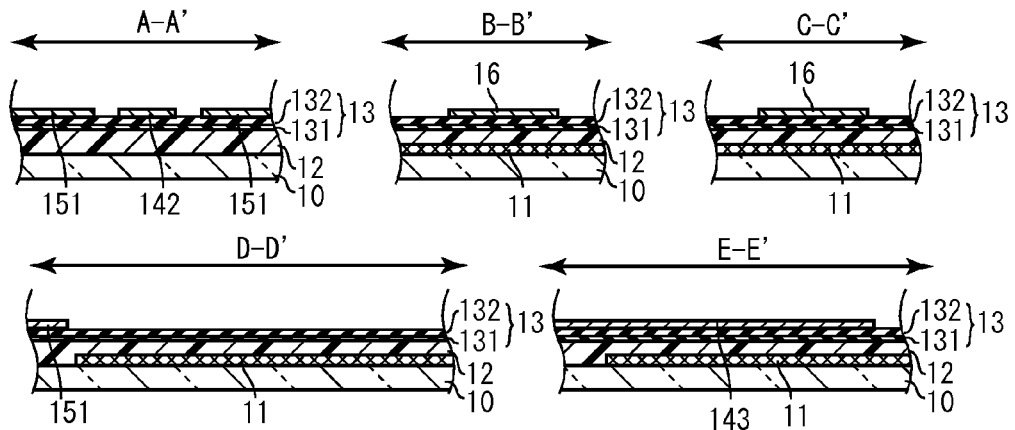
FIG. 7D shows cross-sections for illustrating the method of manufacturing the touch panel according to the first embodiment of the present invention.

Next, as shown in FIG. 7D, connecting portions 142 and 143 for X electrodes 14, insular electrodes 151 for Y electrodes 15, and terminals 16 are formed. Although not shown in FIG. 7D, insular electrodes 141 for the X electrodes 14 are also formed in this step. First, a uniform transparent conductive film is formed by sputtering or CVD. The transparent conductive film may be made of ITO or IZO, for example. The thickness of the transparent conductive film may be in the range of 10 to 50 nm, for example. The transparent conductive film that has been formed is photolithographically patterned. More specifically, a mask made of photoresist is formed in the regions where insular electrodes 141 and 151, connecting portions 142 and 143 and terminals 16 are to be formed. Then, the uncovered portions are etched away. The etching may be performed using a mixture of phosphoric acid, acetic acid and nitric acid, or oxalic acid, for example. Once the patterning is completed, annealing is performed in the temperature range of 200 to 250° C. This annealing renders the amorphous transparent conductive film polycrystalline.

Thus, in the present embodiment, the X electrodes 14, portions of the Y electrodes 15, and the terminals 16 are formed of the same material in the same step.

Figure 7E:
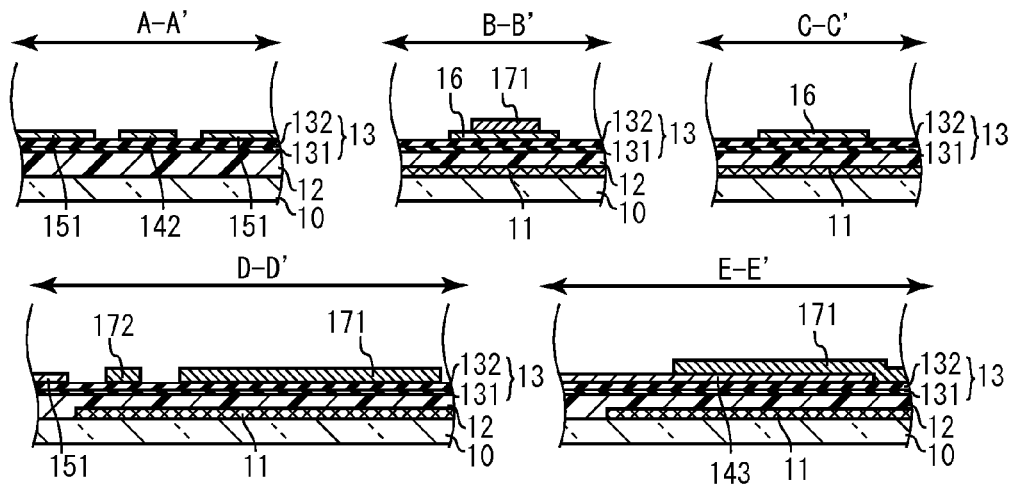
FIG. 7E shows cross-sections for illustrating the method of manufacturing the touch panel according to the first embodiment of the present invention.

Next, as shown in FIG. 7E, lines 171 and ground line 172 are formed. First, a uniform metal film is formed by sputtering or vapor deposition, for example. Preferably, the metal film has a low resistance, and may be made of Al, for example. However, when Al is in contact with a conductive oxide film such as ITO, differences in ionization tendency may produce galvanic corrosion. In view of this, the metal film is preferably a laminate with a metal having a high corrosion resistance. Thus, the metal film may suitably be a laminate film of MoNb, Al and MoNb, a laminate film of MoN, Al and MoN, or laminate film of Mo, Al and Mo, for example. The thickness of the metal film may be in the range of 0.3 to 1.0 µm, for example. The metal film that has been formed is photolithographically patterned. More specifically, a mask made of photoresist is formed in the regions where lines 171 and ground line 172 are to be formed. Then, the uncovered portions are etched away. The etching may be performed using a mixture of phosphoric acid, acetic acid and nitric acid, for example.

Figure 7F:
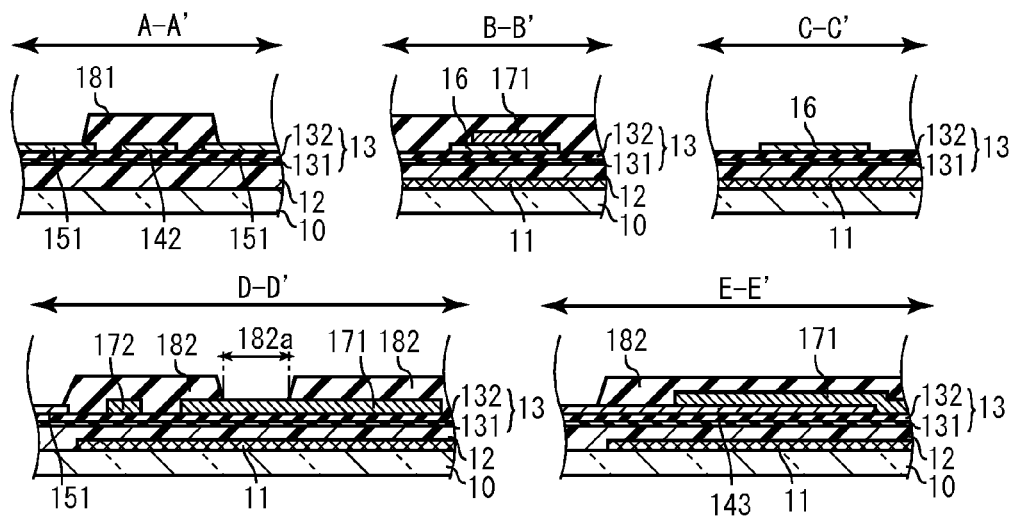
FIG. 7F shows cross-sections for illustrating the method of manufacturing the touch panel according to the first embodiment of the present invention.

Next, as shown in FIG. 7F, insulating films 181 and 182 are formed. The insulating films 181 and 182 may be made of an organic or inorganic material.

An implementation where the insulating films 181 and 182 are made of an organic material will be described. The organic material may be a photoresist containing an acrylic resin or novolak resin, for example. Photoresist is uniformly applied generally to the entire surface of the substrate 10 using a spin coater or slit coater. The photoresist may have any thickness, for example in the range of 1.5 to 3.0 µm. The photoresist that has been formed is photolithographically patterned to form insulating films 181 and 182. At this time, contact holes 182a are also formed.

An implementation where the insulating films 181 and 182 are made of an inorganic material will be described. The inorganic material may be, for example, SiN, SiO or SiON. A uniform film of such a material is formed generally on the entire surface of the substrate 10 by CVD. The thicker the film is, the better it is; preferably, the film has a thickness twice the thickness of the lines 171 and ground line 172 or larger. The film that has been formed is photolithographically patterned. More specifically, a mask made of photoresist is formed in the regions where insulating films 181 and 182 are to be formed. Then, the uncovered portions are etched away. At this time, contact holes 182a are formed. The etching may be dry etching using a fluorine-containing gas, for example.

In any case, each of the insulating films 181 and 182 preferably has a forward-tapered cross-section. More specifically, each of the insulating films 181 and 182 preferably has a tapered cross-section that is convex away from the substrate 10, because this prevents the connecting portions 152 and 153 that are formed on the insulating films 181 and 182 (see FIG. 7G) from being broken by the steps at the boundaries of the insulating films 181 and 182.

In implementations where the insulating films 181 and 182 are made of an organic material, a forward-tempered geometry may be produced by exposing them to light using a photomask in which the optical transmittance changes stepwise. In implementations where the insulating films 181 and 182 are made of an inorganic material, a forward-tapered geometry may be produced by regulating etching conditions or laminating films.

Figure 7G:
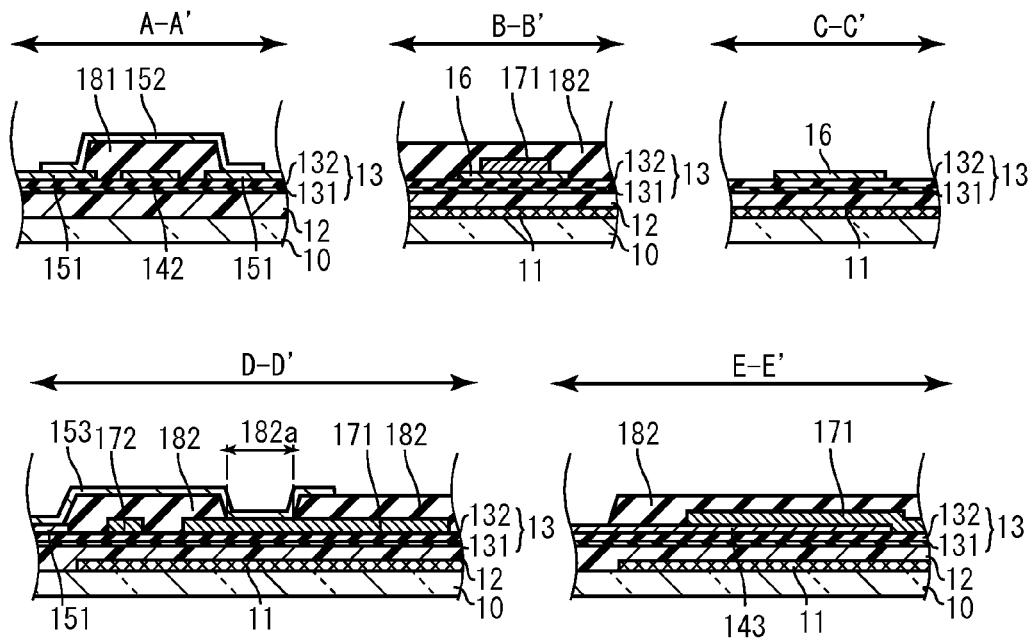
FIG. 7G shows cross-sections for illustrating the method of manufacturing the touch panel according to the first embodiment of the present invention.

Next, as shown in FIG. 7G, connecting portions 152 and 153 for the Y electrodes 15 are formed. First, a uniform transparent conductive film is formed by sputtering or CVD. The transparent conductive film may be made of ITO or IZO, for example. The thickness of the transparent conductive film may be in the range of 10 to 50 nm, for example. The transparent conductive film that has been formed is photolithographically patterned. More specifically, a mask made of photoresist is formed in the regions where connecting portions 152 and 153 are to be formed. Then, the uncovered portions are etched away. The etching may be performed using a mixture of phosphoric acid, acetic acid and nitric acid, or oxalic acid, for example. Once the patterning is completed, annealing may be performed to render the connecting portions 152 and 153 polycrystalline.

Figure 7H:
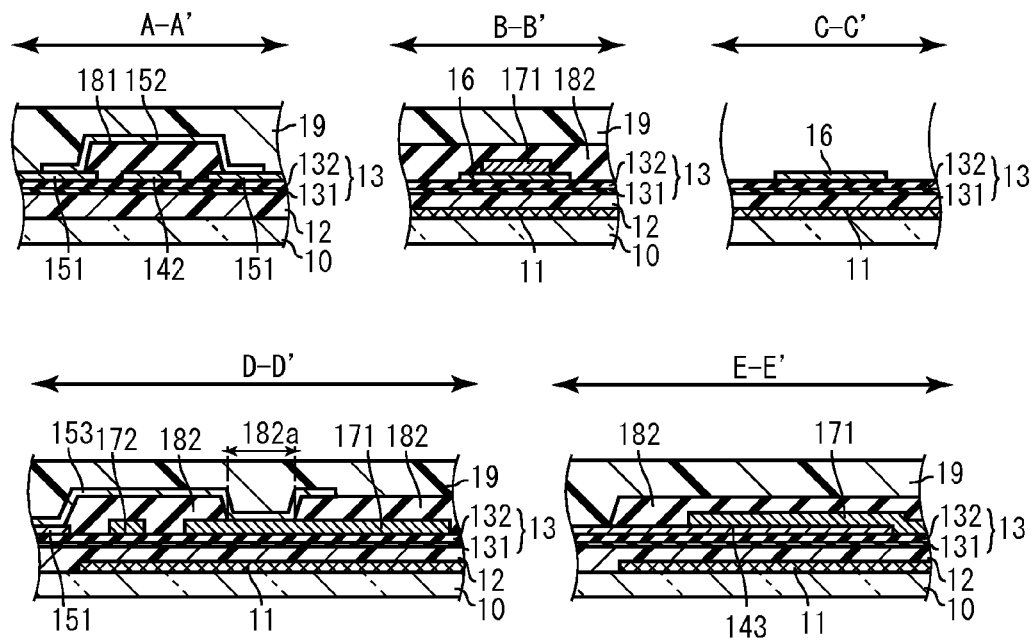
FIG. 7H shows cross-sections for illustrating the method of manufacturing the touch panel according to the first embodiment of the present invention.

Lastly, as shown in FIG. 7H, a protection film 19 is formed generally over the entire surface of the substrate 10. The protection film 19 may be an organic or inorganic material. The organic material may be an acrylic resin, for example, and may be formed using a spin coater or slit coater. The inorganic material may be SiN, for example, and may be formed by CVD. In any case, a mask or the like is used to form such a protection film 19 that will expose a portion of each of the terminals 16.

A construction of the touch panel 1 according to the first embodiment of the present invention and a method of manufacturing it have been described.

In the construction of the touch panel 1 according to the present embodiment, a planarizing film 12 is provided over the substrate 10 and light-shielding film 11. The planarizing film 12 planarizes the steps produced by the light-shielding film 11. As such, the steps in the light-shielding film 11 do not affect elements in layers that are more distant from the substrate 10 than the planarizing film 12 is. In the present embodiment, the connecting portions 143 of the X electrodes 14 and the connecting portions 153 of the Y electrodes 15 are formed to straddle an edge of the light-shielding film 11 in a plan view. Nevertheless, the planarizing film 12 ensures that the connecting portions 143 and 153 are not broken.

The surface roughness of the light-shielding film 11 depends on the particle size of the pigment. A light-shielding film 11 with a large surface roughness makes it difficult to form a uniform thin film on the light-shielding film 11. As a planarizing film 12 is provided over the light-shielding film 11, the surface is advantageously made smooth.

In the above arrangement, a barrier film 13 is provided over the planarizing film 12. The planarizing film 12 may contain residual solvent. Further, during the manufacturing process, the planarizing film 12 is exposed to a developer, cleaner and other substances for photolithography and may absorb some amounts of them. Furthermore, the planarizing film 12 may absorb water in the atmosphere. During the manufacturing process, such water or impurities may appear on the surface of the planarizing film 12. If a transparent conductive film is formed on a surface with such water or impurities, the water or impurities may affect the transparent conductive film, increasing its resistance. In the present embodiment, a transparent conductive film is formed on a barrier film 13. This will prevent the resistance of the transparent conductive film from increasing.

In the present embodiment, the barrier film 13 is a laminate having a first inorganic film 131 and a second inorganic film 132. The second inorganic film 132 has a refractive index smaller than that of the first inorganic film 131. Generally, the higher the refractive index of an inorganic film, the denser the film becomes; the lower the refractive index of an inorganic film, the coarser the film. Accordingly, the first inorganic film 131 is denser than the second inorganic film 132 and has a higher barrier performance. On the other hand, the second inorganic film 132 is coarser than the first inorganic film 131 and has a higher reactivity. As the barrier film 13 is a laminate, a high barrier performance is achieved and its adhesion to the X and Y electrodes 14 and 15 is improved.

Further, in the present embodiment, the first inorganic film 131 preferably has a thickness of 3 to 12 nm and the second inorganic film 132 preferably has a thickness of 30 to 160 nm. The X and Y electrodes 14 and 15 are placed over the display region of the liquid crystal display device 101 (see FIG. 1) for use. Thus, preferably, the X and Y electrodes 14 and 15 are substantially invisible to the user, that is, have a high optical transmittance. In the present embodiment, the interference of light reflected from the interface between the films will improve the optical transmittance of the X and Y electrodes 14 and 15.

The above value ranges were obtained in the following manner. The thicker the first inorganic film 131, the smaller its adhesiveness becomes due to film stress; the thinner the film, the smaller its barrier performance. In view of this, first, the thickness of the first inorganic film 131 was fixed to 9 nm and the thickness of the second inorganic film 132 was changed. It was found out that the X and Y electrodes 14 and 15 were visible when the thickness of the second inorganic film 132 was smaller than 30 nm. Also, the X and Y electrodes 14 and 15 were visible when the thickness of the second inorganic film 132 was larger than 160 nm. Next, the thickness of the second inorganic film 132 was fixed to 90 nm and the thickness of the first inorganic film 131 was changed. It was found out that the X and Y electrodes 14 and 15 were visible when the thickness of the first inorganic film 131 was smaller than 3 nm. Also, the X and Y electrodes 14 and 15 were visible when the thickness of the first inorganic film 131 was larger than 12 nm. These results suggest that the thickness of the first inorganic film 131 is preferably in the range of 3 to 12 nm and the thickness of the second inorganic film 132 is preferably in the range of 30 to 160 nm.

In the embodiment, the lines 171 and ground line 172 are only provided in the non-sensing region P. As such, the lines 171 and ground line 172 overlie the light-shielding film 11 in a plan view. Thus, the lines 171 and ground line 172 are not visible to the user. Thus, the lines 171 and ground line 172 may be made of a material having a high reflectance.

In the present embodiment, the barrier film 13 is provided generally over the entire surface of the planarizing film 12. As such, the terminals 16 are provided on the barrier film 13. This will prevent the resistance of the terminals 16 from increasing even when the planarizing film 12 contains water or impurities.

In the present embodiment, the X electrodes 14, portions of the Y electrodes 15, and the terminals 16 are formed of the same material in the same step. This reduces the number of manufacturing steps. The X and Y electrodes 14 and 15 are preferably thin to increase their optical transmittance. Since the barrier film 13 prevents the resistance of the terminals 16 from increasing, even terminals 16 made from a thin film are capable of functioning.

Comparative Examples

Figure 8:
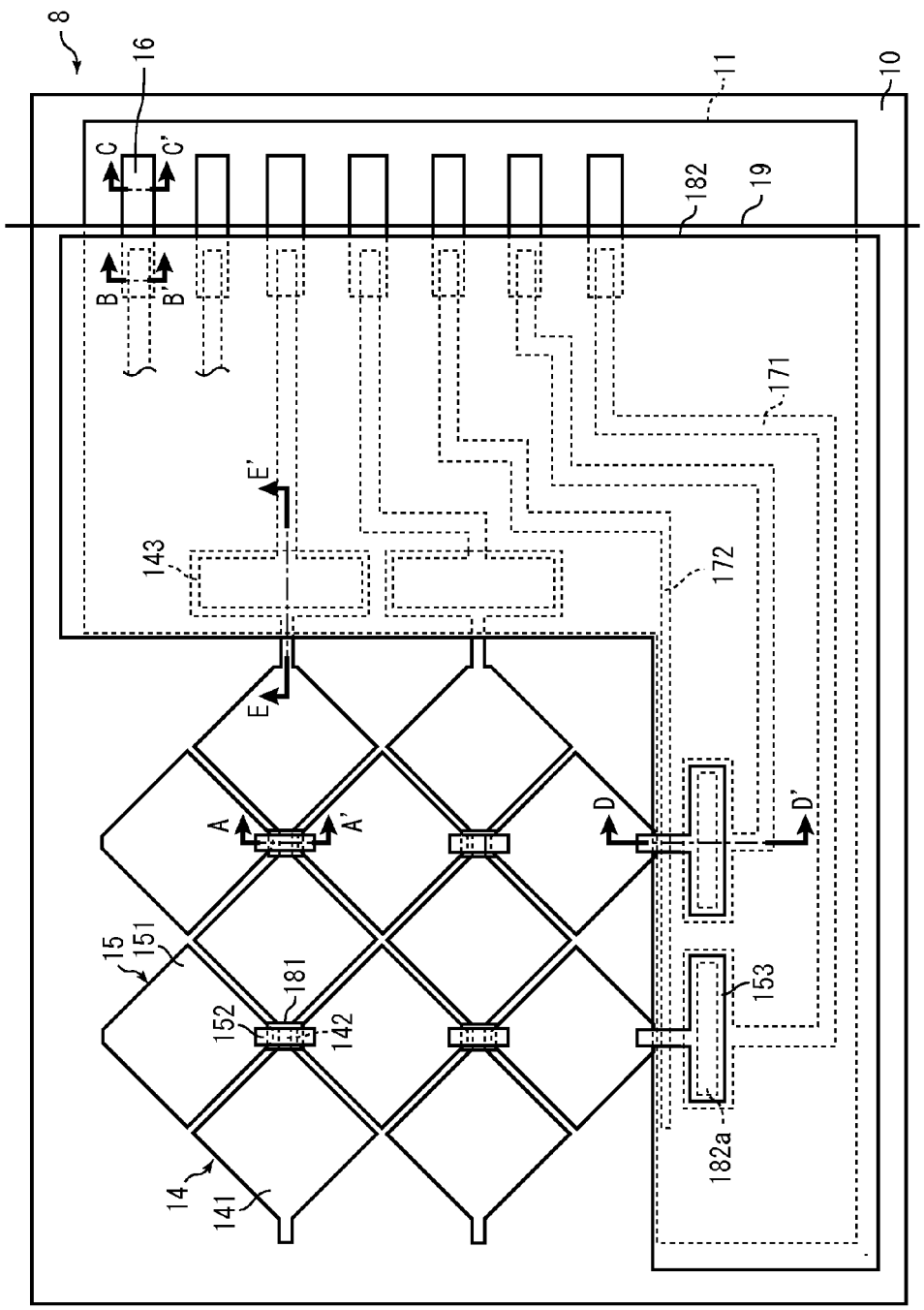
FIG. 8 is a schematic plan view of a first comparative example of a touch panel.
Figure 9:
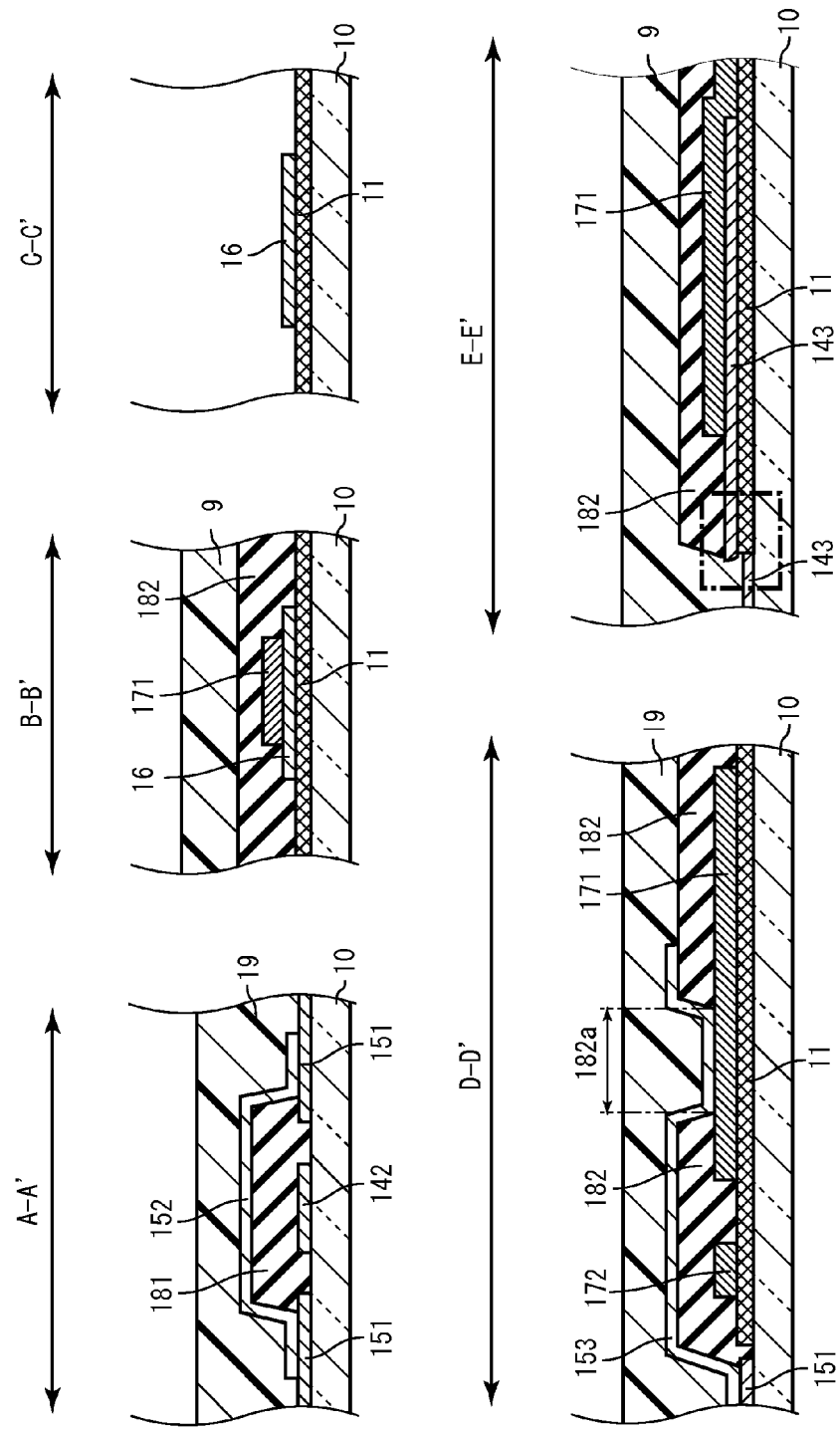
FIG. 9 shows cross-sections taken along lines A-A', B-B', C-C', D-D' and E-E' of FIG. 8.

To illustrate the advantages of the touch panel 1 of the present embodiment, imaginary comparative examples will be described. FIG. 8 is a schematic plan view of a touch panel 8 according to a first comparative example. FIG. 9 shows cross-sections taken along lines A-A', B-B', C-C', D-D' and E-E' of FIG. 8. The touch panel 8 has the arrangement of the touch panel 1 without the planarizing film 12 and barrier film 13.

The connecting portions 143 of the X electrodes 14 straddle an edge of the light-shielding film 11 in a plan view. The light-shielding film 11 may be formed, for example, by mixing negative resist with a pigment. As such, edge portions in the pattern are likely to be exposed to an insufficient amount of light, making it difficult to produce a forward-tapered geometry. This may cause a connecting portion 143 to be broken by a step in the light-shielding film 11, as indicated by the portion of FIG. 9 that is surrounded by chain lines.

Figure 10:
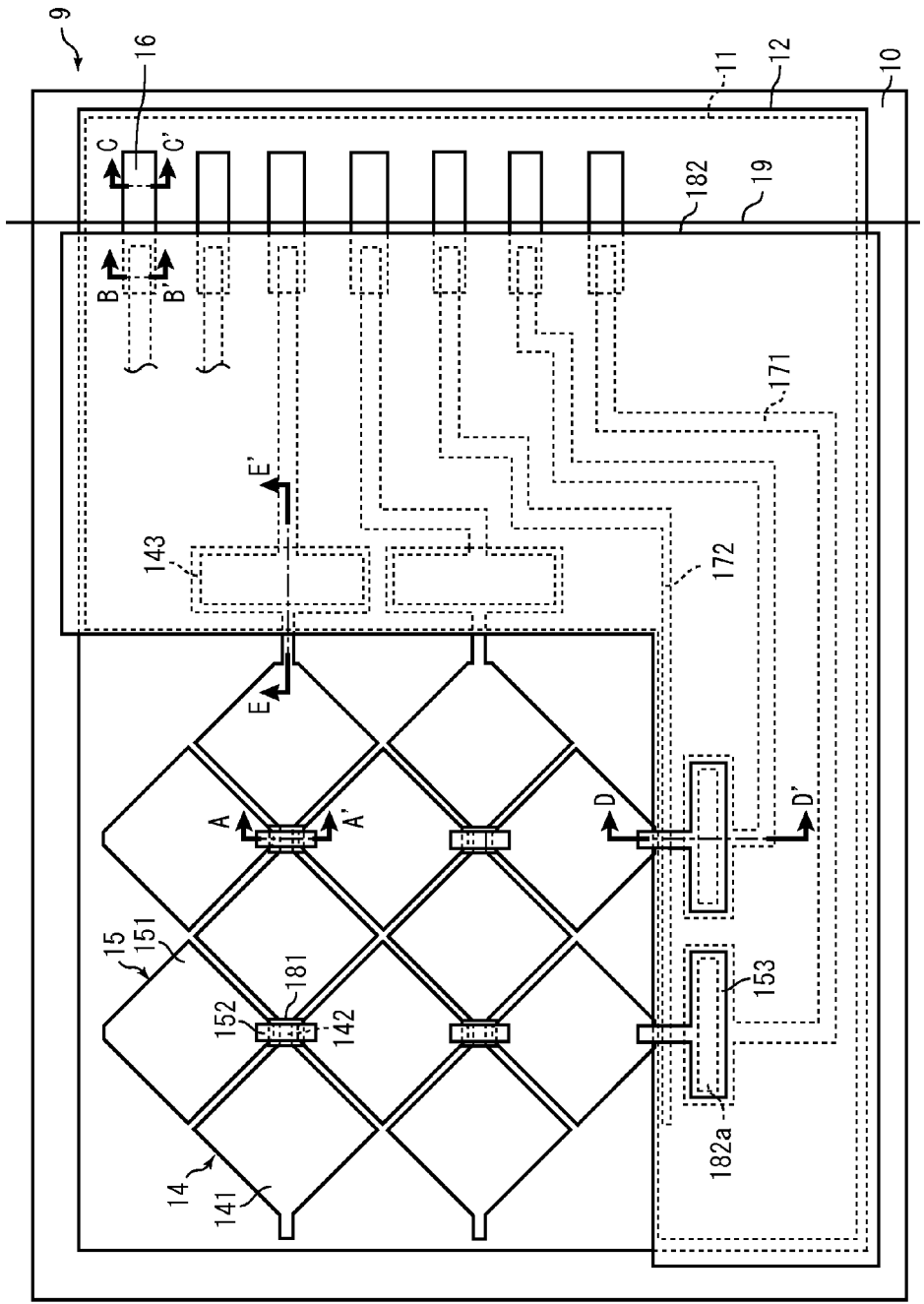
FIG. 10 is a schematic plan view of a second comparative example of a touch panel.
Figure 11:
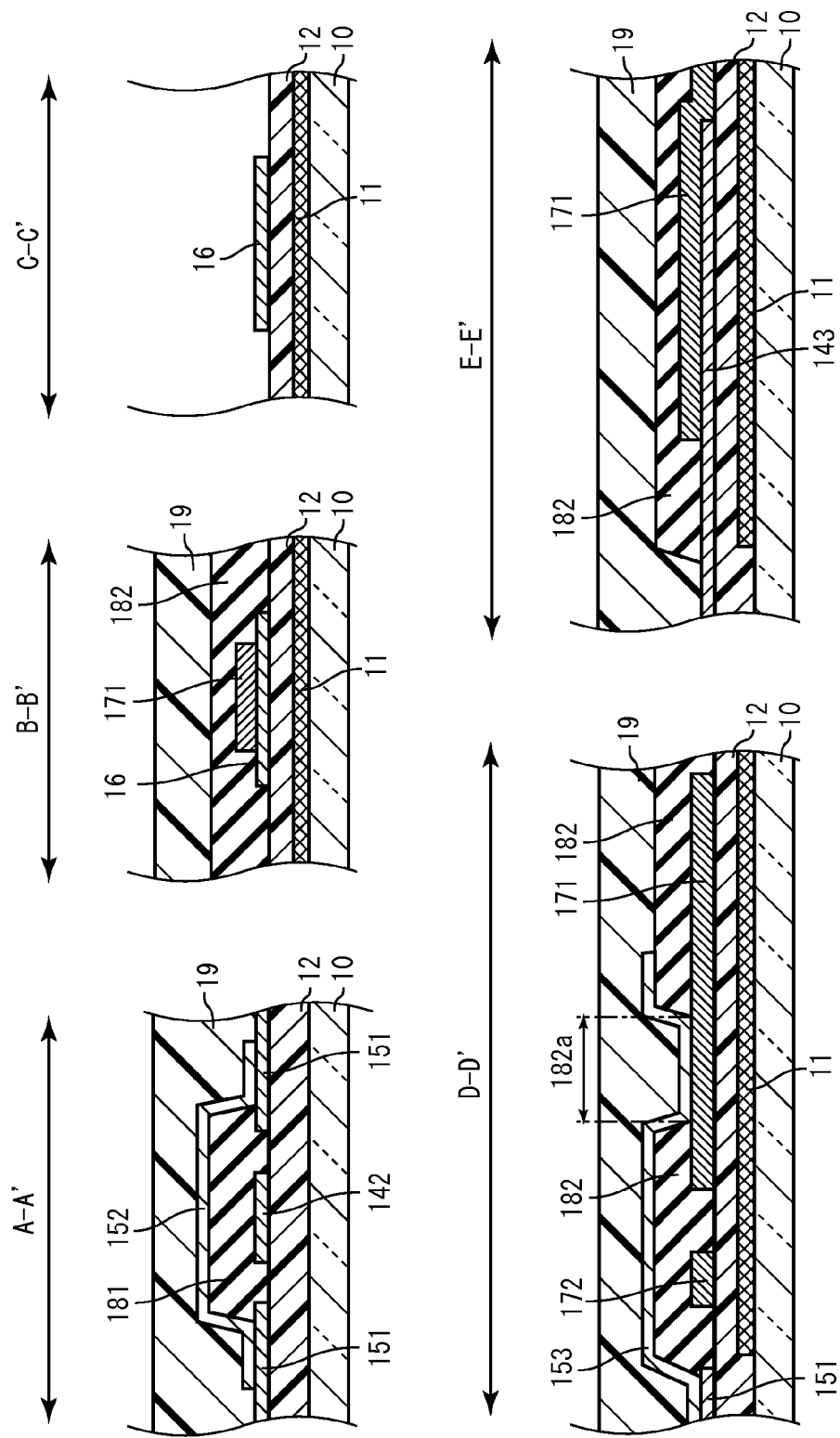
FIG. 11 shows cross-sections taken along lines A-A', B-B', C-C', D-D' and E-E' of FIG. 10.

FIG. 10 is a schematic plan view of a second comparative example of a touch panel 9. FIG. 11 shows cross-sections taken along lines A-A', B-B', C-C', D-D' and E-E' of FIG. 10. The touch panel 9 has the arrangement of the touch panel 8 with a planarizing film 12 added thereto. In other words, the touch panel 9 has the arrangement of the touch panel 1 without the barrier film 13.

In the touch panel 9, the planarizing film 12 prevents the connecting portions 143 from being broken. However, if the planarizing film 12 contains water or impurities, it increases the resistance of the portions of the X electrodes 14, Y electrodes 15 and terminals 16 that are in contact with the planarizing film 12. This may lead to decreased reliability or decreased sensor sensitivity.

The touch panel 1 according to the first embodiment of the present invention includes a planarizing film 12 and barrier film 13. The planarizing film 12 prevents the connecting portions 143 from being broken. Further, as the barrier film 13 is provided on the planarizing film 12, the resistance of the X electrodes 14, Y electrodes 15 and terminals 16 is not increased even when the planarizing film 12 contains water or impurities.

Second Embodiment

Figure 12:
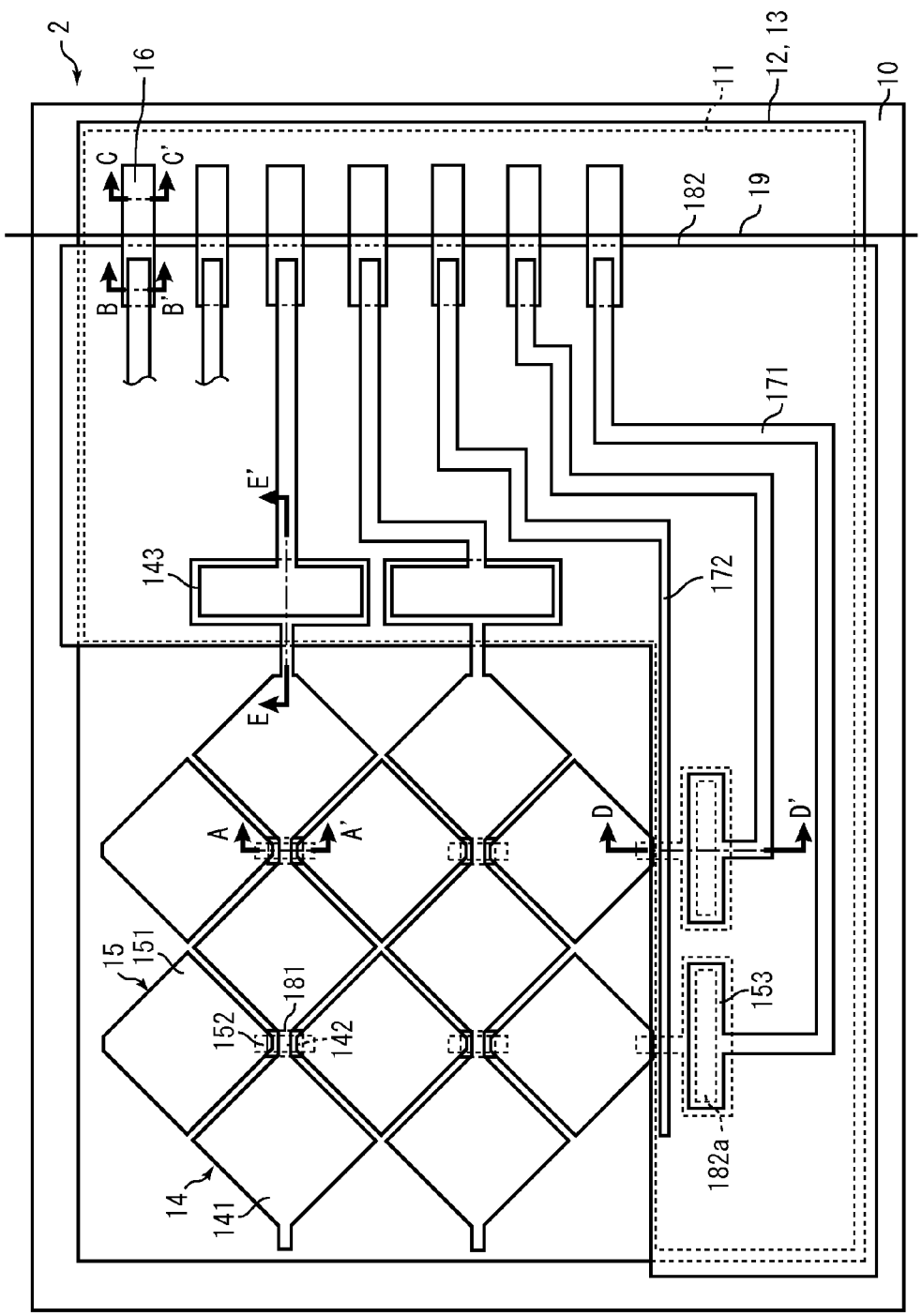
FIG. 12 is a schematic plan view of a touch panel according to a second embodiment of the present invention.
Figure 13:
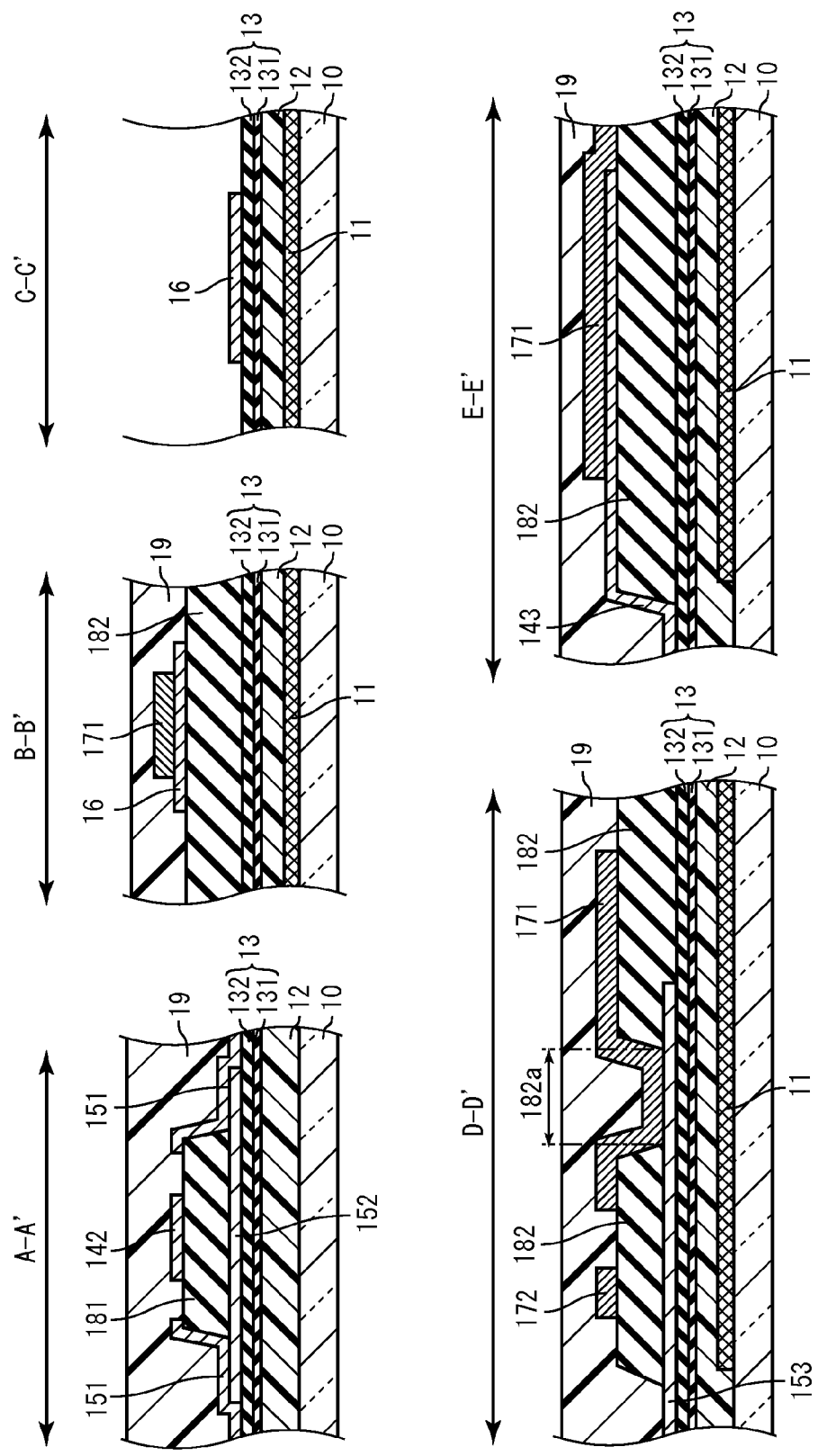
FIG. 13 shows cross-sections taken along lines A-A', B-B', C-C', D-D' and E-E' of FIG. 12.

A touch panel-equipped display device 100 may include a touch panel 2 described below instead of the touch panel 1. FIG. 12 is a schematic plan view of a touch panel 2 according to a second embodiment of the present invention. FIG. 13 shows cross-sections taken along lines A-A', B-B', C-C', D-D' and E-E' of FIG. 12.

The touch panel 2 is different from the touch panel 1 in terms of the order in which the components are formed. As such, the films are deposited in a different order.

[Method of Manufacturing Touch Panel 2]

A method of manufacturing the touch panel 2 will be briefly described with reference to FIGS. 14A to 14E. FIGS. 14A to 14E show cross-sections taken along lines A-A', B-B', C-C', D-D' and E-E' of FIG. 13.

On a substrate 10 are formed a light-shielding film 11, a planarizing film 12 and a barrier film 13. These steps are the same as those for the touch panel 1, and thus they are not illustrated in drawings.

Figure 14A:
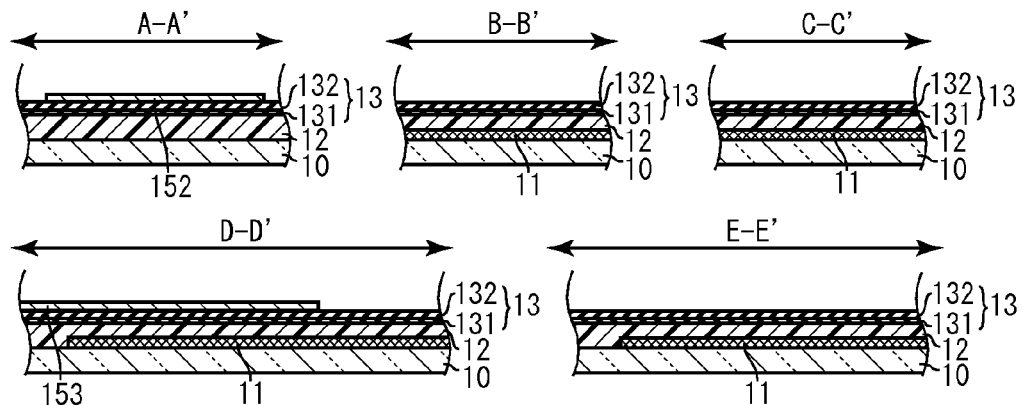
FIG. 14A shows cross-sections for illustrating a method of manufacturing the touch panel according to the second embodiment of the present invention.

Next, as shown in FIG. 14A, connecting portions 152 and 153 for Y electrodes 15 are formed.

Figure 14B:
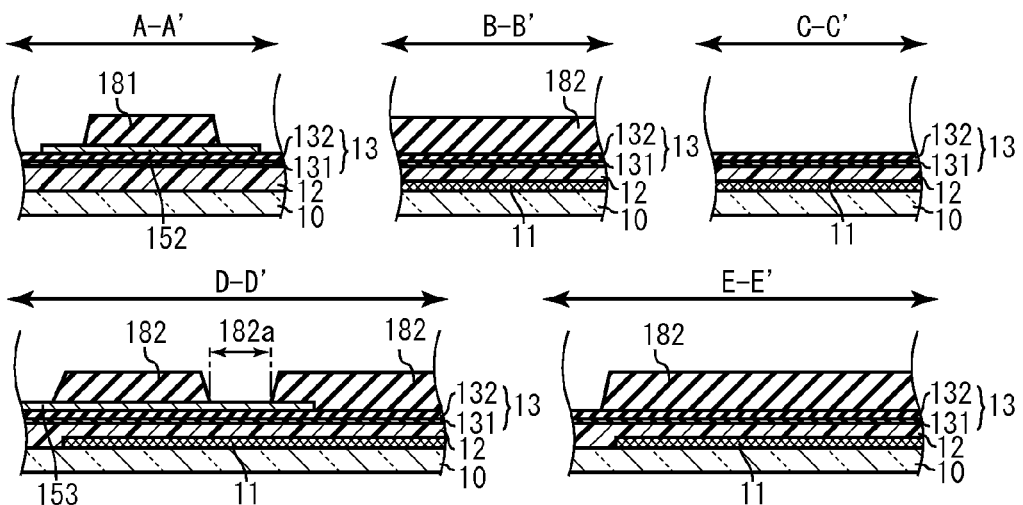
FIG. 14B shows cross-sections for illustrating the method of manufacturing the touch panel according to the second embodiment of the present invention.

Next, as shown in FIG. 14B, insulating films 181 and 183 are formed.

Figure 14C:
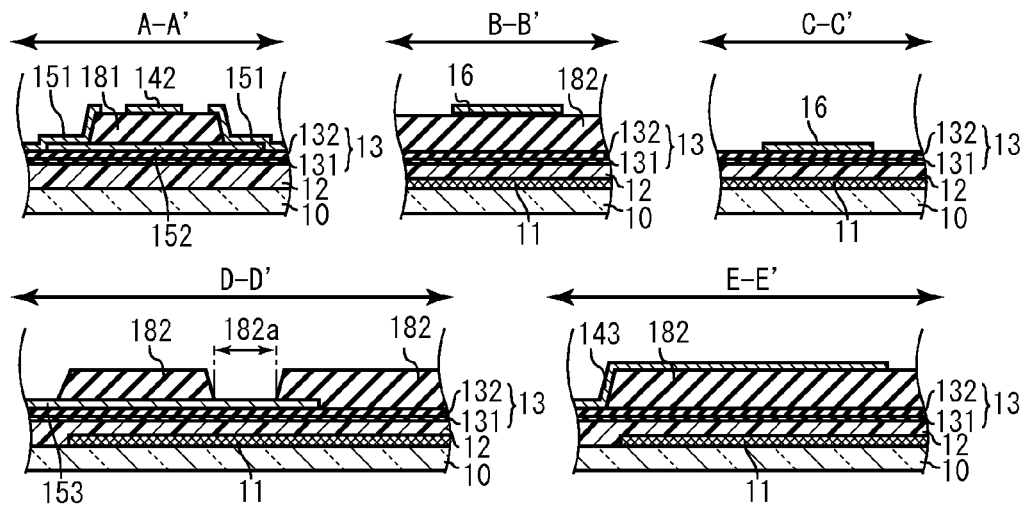
FIG. 14C shows cross-sections for illustrating the method of manufacturing the touch panel according to the second embodiment of the present invention.

Next, as shown in FIG. 14C, connecting portions 142 and 143 for X electrodes 14, insular electrodes 151 for the Y electrodes 15, and terminals 16 are formed. Although not shown in FIG. 14C, insulating electrodes 141 for the X electrodes 14 are also formed in this step.

Figure 14D:
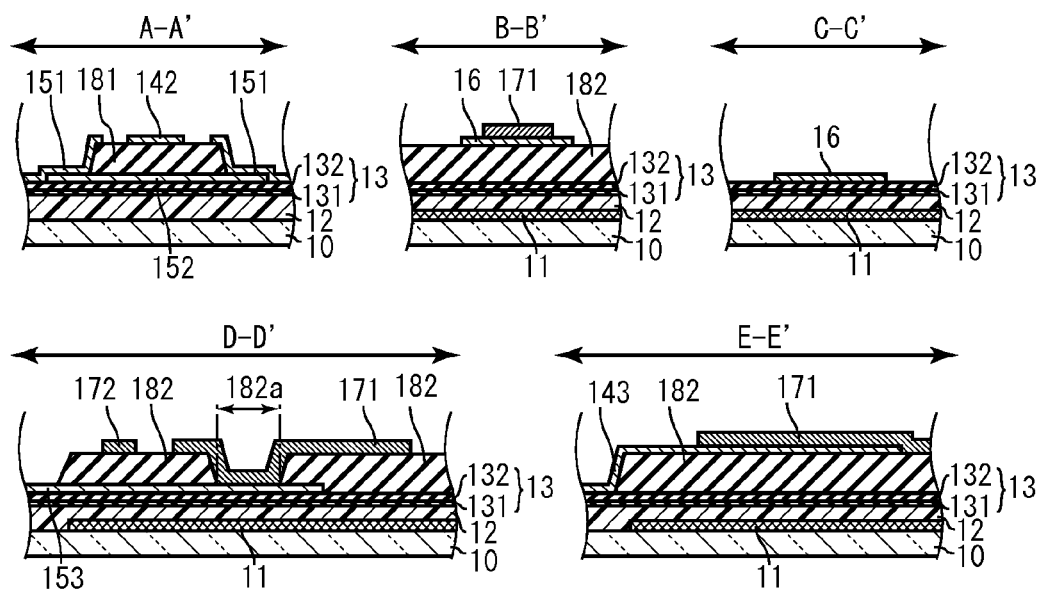
FIG. 14D shows cross-sections for illustrating the method of manufacturing the touch panel according to the second embodiment of the present invention.
Figure 14E:
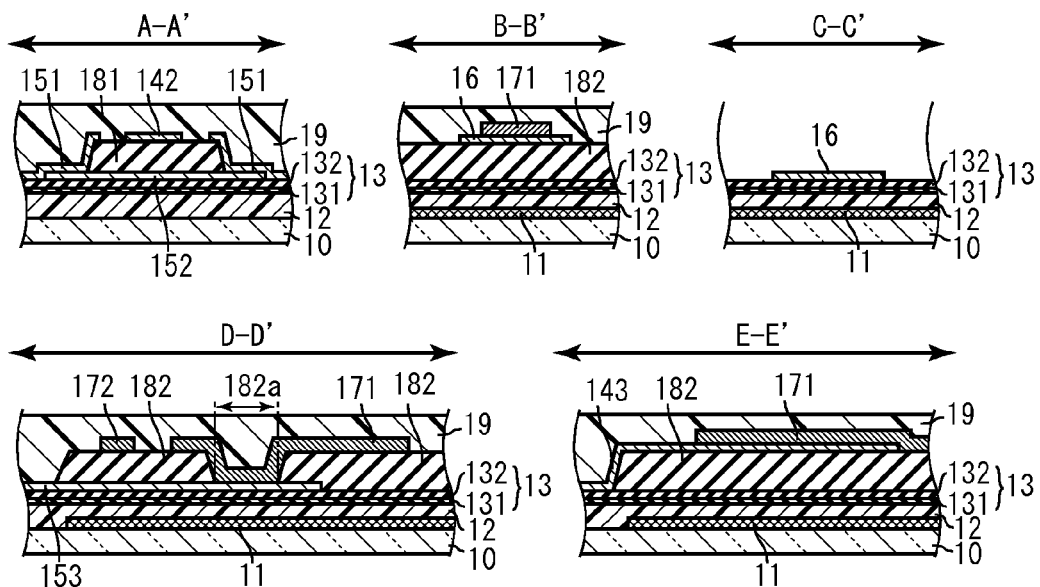
FIG. 14E shows cross-sections for illustrating the method of manufacturing the touch panel according to the second embodiment of the present invention.

Next, as shown in FIG. 14D, lines 171 and ground line 172 are formed.

Lastly, as shown in FIG. 17D, a protection film 19 is formed.

A construction of the touch panel 2 according to the second embodiment of the present invention and a method of manufacturing it have been described.

In the touch panel 2, too, the connecting portions 143 of the X electrodes 14 and the connecting portions 153 of the Y electrodes 15 straddle an edge of the light-shielding film 11 in a plan view. Again, the planarizing film 12 prevents the connecting portions 143 and 153 from being broken by the steps in the light-shielding film 11.

Further, similar to the touch panel 1, the barrier film 13 on the planarizing film 12 prevents the resistance of the X electrodes 14, Y electrodes 15 and terminals 16 from increasing even when the planarizing film 12 contains water or impurities.

Other Embodiments

Although embodiments of the present invention have been described, the present invention is not limited to the above embodiments, and various modifications are possible within the scope of the invention.

INDUSTRIAL APPLICABILITY

The present invention is industrially useful in a touch panel or a touch panel-equipped display device.

The invention claimed is:

1. A touch panel comprising:
a transparent substrate including, on one surface thereof, a covered portion that is covered by a light-shielding film which blocks light and an uncovered portion that is not covered by a light-shielding film;
a planarizing film directly contacting the substrate in both of the covered portion and the uncovered portion of the substrate;
a barrier film on the planarizing film;
a sensor electrode on and directly contacting the barrier film in a region that overlaps the uncovered portion of the substrate in a plan view;
a terminal in a layer that is more distant from the substrate than the planarizing film and in a region that overlaps the covered portion of the substrate in the plan view; and
a wiring line in a layer that is more distant from the substrate than the planarizing film to electrically connect the sensor electrode with the terminal and in a region that overlaps the covered portion of the substrate,
wherein the barrier film is between the planarizing film and the sensor electrode, and includes:
a first inorganic film adjacent to the planarizing film; and
a second inorganic film on the first inorganic film having a smaller refractive index than the first inorganic film.

2. The touch panel according to claim 1, wherein:
the first inorganic film has a refractive index of 1.72 to 1.98, and
the second inorganic film has a refractive index of 1.41 to 1.68.

3. The touch panel according to claim 2, wherein:
the first inorganic film has a thickness of 3 nm to 12 nm, and
the second inorganic film has a thickness of 30 nm to 160 nm.

4. The touch panel according to claim 1, wherein the first inorganic film includes a silicon nitride film.

5. The touch panel according to claim 1, wherein the second inorganic film includes one of silicon oxide and silicon oxynitride.

6. The touch panel according to claim 1, wherein the terminal is located on the barrier film.

7. A touch panel-equipped display device, comprising:
a liquid crystal display device; and
the touch panel according to claim 1.

8. The touch panel according to claim 1, wherein
the barrier film covers an entire surface of the planarizing film, and
the terminal is on the barrier film.

* * * * *